(12) United States Patent
Yang

(10) Patent No.: US 7,344,088 B2
(45) Date of Patent: Mar. 18, 2008

(54) DUAL-FUNCTION VALVE WITH PRESSURE ADJUSTMENT AND TEMPERATURE CONTROL FUNCTIONS

(76) Inventor: Tzai-Jen Yang, 235 Chung-Ho Box 8-24, Taipei (TW)

( * ) Notice: Subject to any disclaimer, the term of this patent is extended or adjusted under 35 U.S.C. 154(b) by 276 days.

(21) Appl. No.: 11/133,033

(22) Filed: May 20, 2005

(65) Prior Publication Data

US 2006/0260682 A1 Nov. 23, 2006

(51) Int. Cl.
*G05D 23/13* (2006.01)

(52) U.S. Cl. .................................................. 236/12.2

(58) Field of Classification Search ..... 236/12.1–12.23
See application file for complete search history.

(56) References Cited

U.S. PATENT DOCUMENTS 2,657,860 A * 11/1953 Schmidt et al. ............ 236/12.2
5,033,671 A * 7/1991 Shiba et al. ............. 236/12.12
5,129,576 A * 7/1992 Pullen et al. ............... 236/12.2
5,340,018 A * 8/1994 MacDonald ............... 236/12.2

* cited by examiner

*Primary Examiner*—William E. Tapolcai

(57) ABSTRACT

A dual-function valve with pressure adjustment and temperature control functions comprises a valve body having a first cool water inlet, a first hot water inlet, two first mixing water outlets, a first chamber and a second chamber; the first chamber and second chamber being communicated by a second cool water channel and a second hot water channel; the second chamber being communicated to the first mixing water outlets through a water outlet channel; a pressure balance device for adjusting the water pressures of hot water and cool water; the pressure balance device being installed in the first chamber; and a temperature control device installed in the second chamber; the temperature control device adjusting the amount of water flowing into the second chamber by expansion and contraction of the mixing water of hot water and cold water; and the temperature control device being connected to the first chamber in parallel.

2 Claims, 8 Drawing Sheets

DUAL-FUNCTION VALVE WITH PRESSURE ADJUSTMENT AND TEMPERATURE CONTROL FUNCTIONS

FIELD OF THE INVENTION

The present invention is related to temperature control valves, and in particular to a dual-function valve with pressure adjustment and temperature control functions.

BACKGROUND OF THE INVENTION

Currently, faucets with mixed hot and cool water does not have the function for controlling the water flow exactly due to the pressure reduction from other resource required water, such as other periphery faucets, or stools. Thereby it is often that the water temperature varies unsteadily.

There are some other kinds of faucets being developed, such as to use a pressure balance valve to control the flows of hot and cool water, or to use a water temperature sensor to control the flow of water. However these cannot have a precise control to the water temperature. In one improvement, a pressure balance device and a water temperature sensor are incorporated to have a precise control to water temperature. However the series connected pressure balance device and water temperature sensor will make the water channel is too narrow to have a larger flow. This is inconvenient to users. Thereby it is necessary to be improved.

SUMMARY OF THE INVENTION

Accordingly, the object of the present invention is to provides a dual-function valve with pressure adjustment and temperature control functions.

To achieve above object, the present invention provides a dual-function valve with pressure adjustment and temperature control functions comprising: a valve body having a first cool water inlet, a first hot water inlet, two first mixing water outlets, a first chamber and a second chamber; the first chamber and second chamber being communicated by a second cool water channel and a second hot water channel; the second chamber being communicated to the first mixing water outlets through a water outlet channel; a pressure balance device for adjusting the water pressures of hot water and cool water; the pressure balance device being installed in the first chamber; and a temperature control device installed in the second chamber; the temperature control device adjusting the amount of water flowing into the second chamber by expansion and contraction of the mixing water of hot water and cold water; and the temperature control device being connected to the first chamber in parallel.

The various objects and advantages of the present invention will be more readily understood from the following detailed description when reading in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
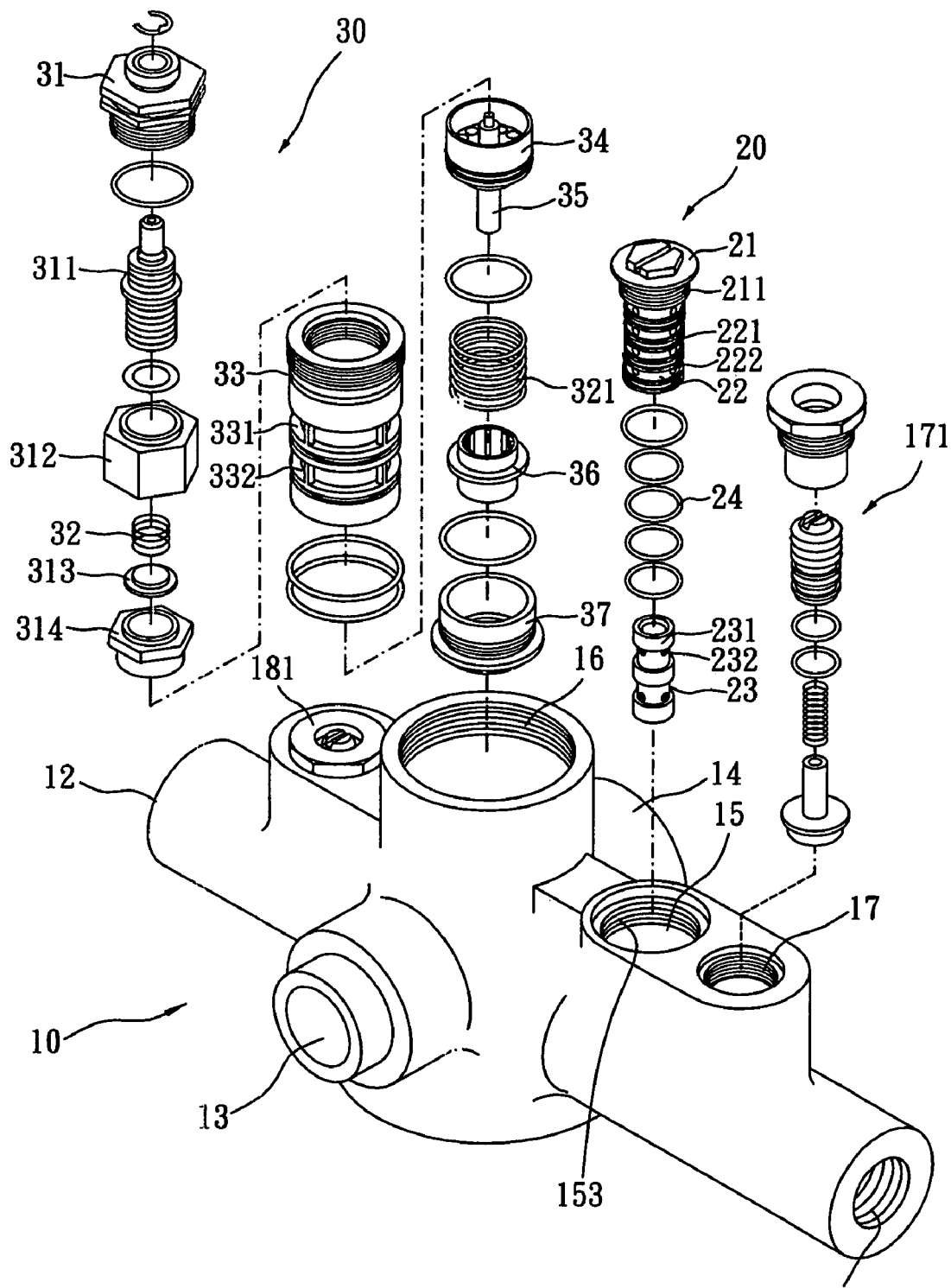
FIG. 1 is an exploded perspective view of the present invention.

Referring to FIG. 1, the dual-function valve with pressure adjustment and temperature control functions of the present invention is illustrated. The present invention has the following elements.

Figure 2:
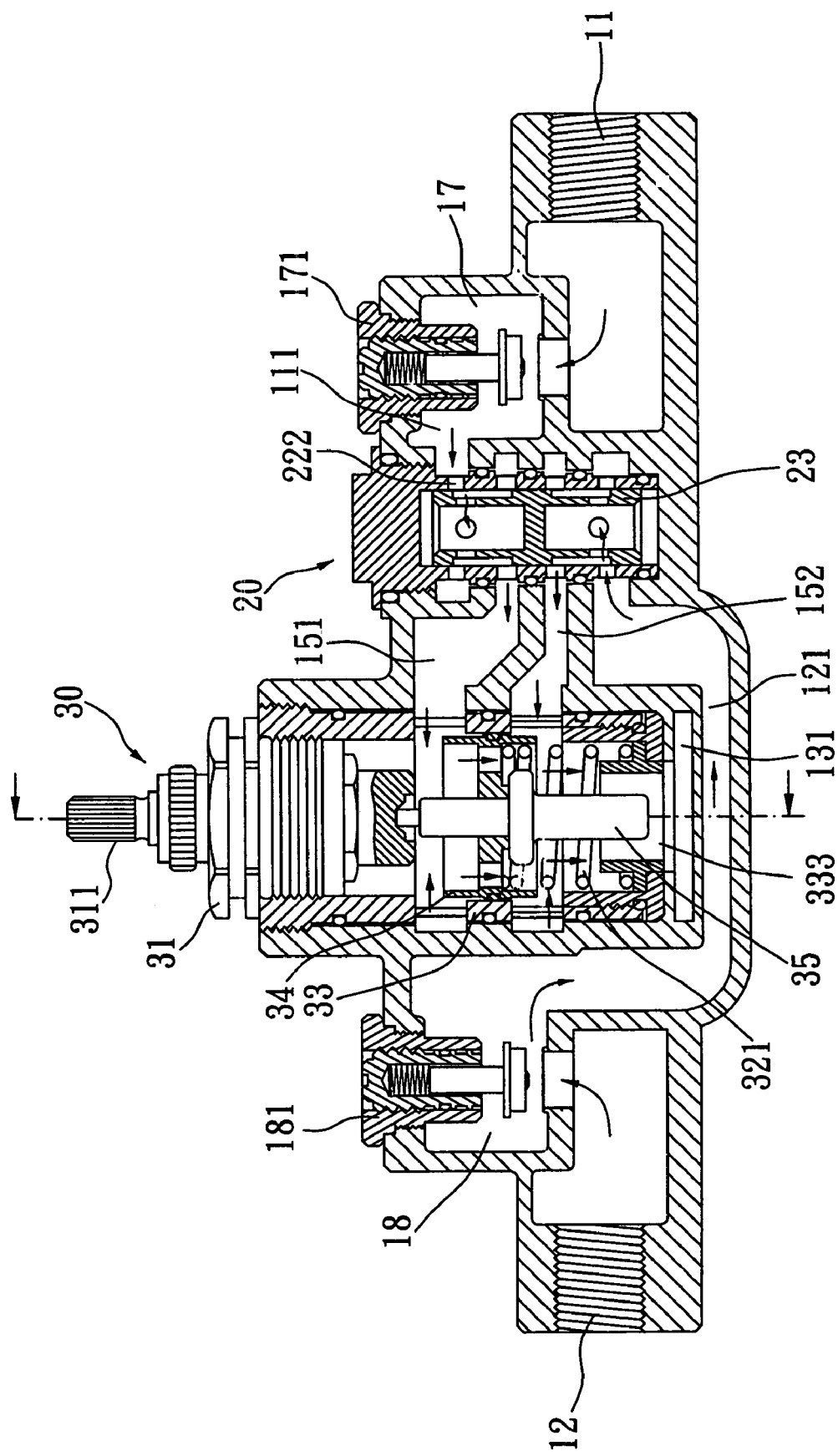
FIG. 2 is a cross sectional view of the present invention.
Figure 3:
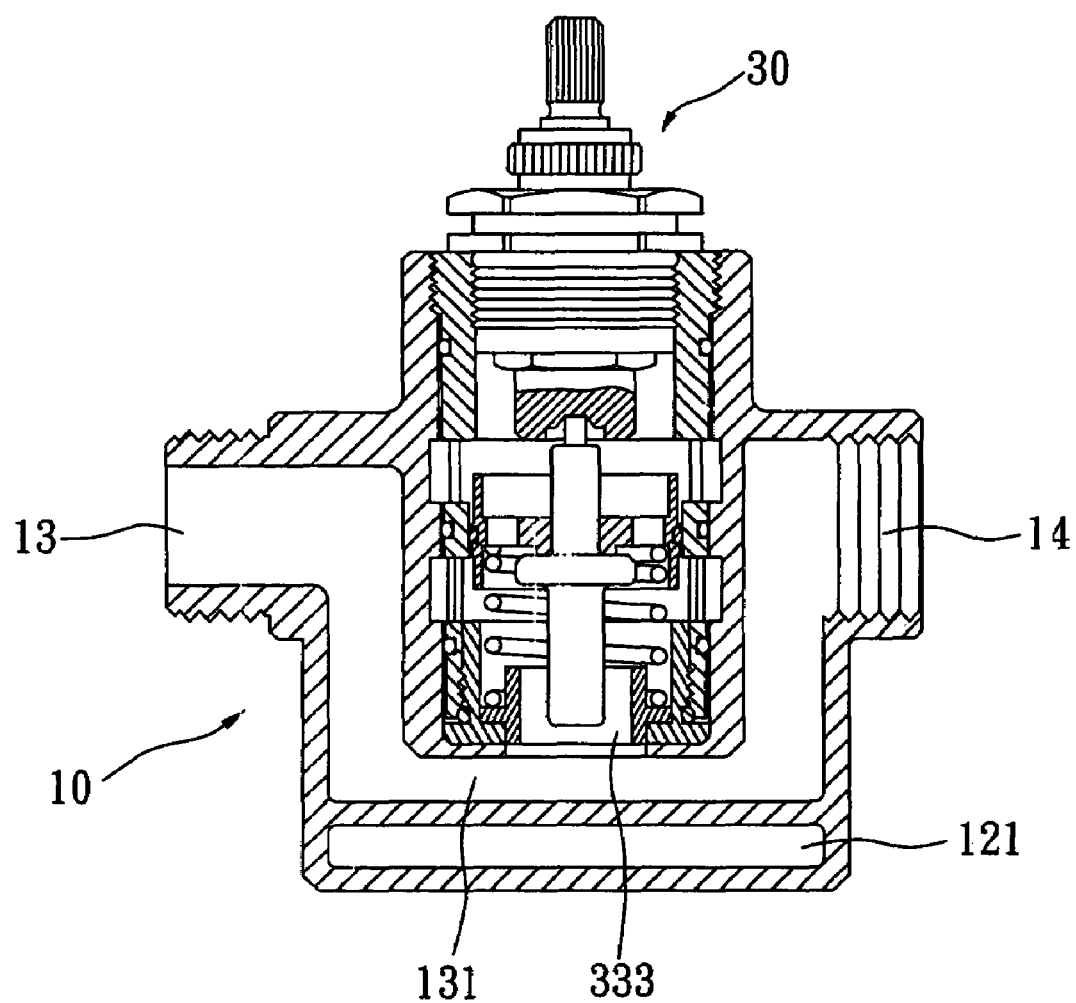
FIG. 3 is a cross sectional view about the second chamber and the mixing water outlet.

A valve body 10, referring to FIGS. 1, 2, and 3, has a first cool water inlet 11, a first hot water inlet 12, two first mixing water outlets 13, 14, a first chamber 15 and a second chamber 16. The first cool water inlet 11 is installed with a third chamber 17 and the second hot water inlet 12 is formed with a fourth chamber 18. The third chamber 17 is installed with a check valve 171 and the fourth chamber 18 is installed with a check valve 181 so as to guide the water flow in the predetermined direction and thus be useful in emergency maintenance. The third chamber 17 is communicated to the first chamber 15 through a first cool water channel 111 so that the water flows through the third chamber 17 to the first chamber 15. The fourth chamber 18 is communicated to the first chamber 15 through a first hot water channel 121 so that water flows through the fourth chamber 18 to the first chamber 15.

The first chamber 15 and second chamber 16 are communicated by a second cool water channel 151 and a second hot water channel 152. The second chamber 16 is communicated to the first mixing water outlets 13, 14 through a water outlet channel 131.

A pressure balance device 20 for adjusting the water pressures of hot water and cool water is installed in the first chamber 15. The pressure balance device 20 is formed by an upper cover 21, a sleeve 22, and a sliding rod 23, etc.

The upper cover 21 is formed with outer thread 211 which is screwable with the inner thread 153 of the first chamber 15 so that the pressure balance device 20 is firmly secured to the first chamber 15. The sleeve 22 is a hollow tube. A top thereof is combined to the upper cover 21. An exterior of the sleeve is installed with four annular trenches 221 for installing a water stop washer 24. The walls between the annular trenches 221 are installed with a plurality of through holes 222 so that water can flow through the through holes 222. The sliding rod 23 is installed in the sleeve 22. By water pressure, the sliding rod 23 is slidable within the sleeve 22 so as to adjust the pressures of the hot water and cool water to be in a balance condition. A middle and two ends of the sliding rod 23 are installed with water stop flanges 231 for controlling the water flow in the sleeve.

A temperature control device 30 is installed in the second chamber 16. The temperature control device 30 adjusts the amount of water flowing into the second chamber 16 by expansion and contraction of the mixing water of hot water and cold water. The temperature control device 30 is connected to the first chamber 15 in parallel. The temperature control device 30 is formed by an upper cover seat 31, a rotary shaft 311, a female screw 312, springs 32, 321, a temperature control valve body 33, a movable block 34, a temperature sensing rod 35, a spring retainer 36, a rotary seat 37, etc.

The upper cover seat 31 is installed with the rotary shaft 311. A lower side of the rotary shaft 311 is screwed with the female screw 312. A top block 313 and the spring 32 are installed within the female screw 312 and a pressure releasing threaded cover 314. A periphery of the temperature control valve body 33 is installed with a second cool water inlet 331 and a second hot water inlet 332. A bottom of the temperature control valve body 33 has a second mixing water outlets 333. The temperature sensing rod 35 with temperature sensing elements and the movable block 34 is installed within the temperature control valve body 33. The rotary shaft 311 is rotated so as to drive the female screw 312 to rotate and thus the top block 313 will eject the temperature sensing rod 35 to drive to the movable block 35 to move synchronously. Thereby the sizes of the second cool water outlet 331 and second hot water outlets 332 are adjusted to control the flow of hot water and cool water.

After the cool water and hot water flow through the pressure balance device 20 of the first chamber 15, the pressures of hot water and cool water are retained in a balance condition. They are then pass through the cool water channel 151 and hot water channel 152 to the temperature control valve body 33 of the temperature control device 30. Then the hot water is mixed with cool water to have a desired water temperature. The water flows out from the mixing water outlet 333 at the lower side of the temperature control valve body 33. The temperature sensor in the temperature sensing rod 35 makes the temperature sensing rod 35 expand or contract slightly and drives the movable block 34 to adjust the volumes of the cool water inlet 331 and hot water inlet 32 to adjust the water temperature precisely and effectively.

Figure 4:
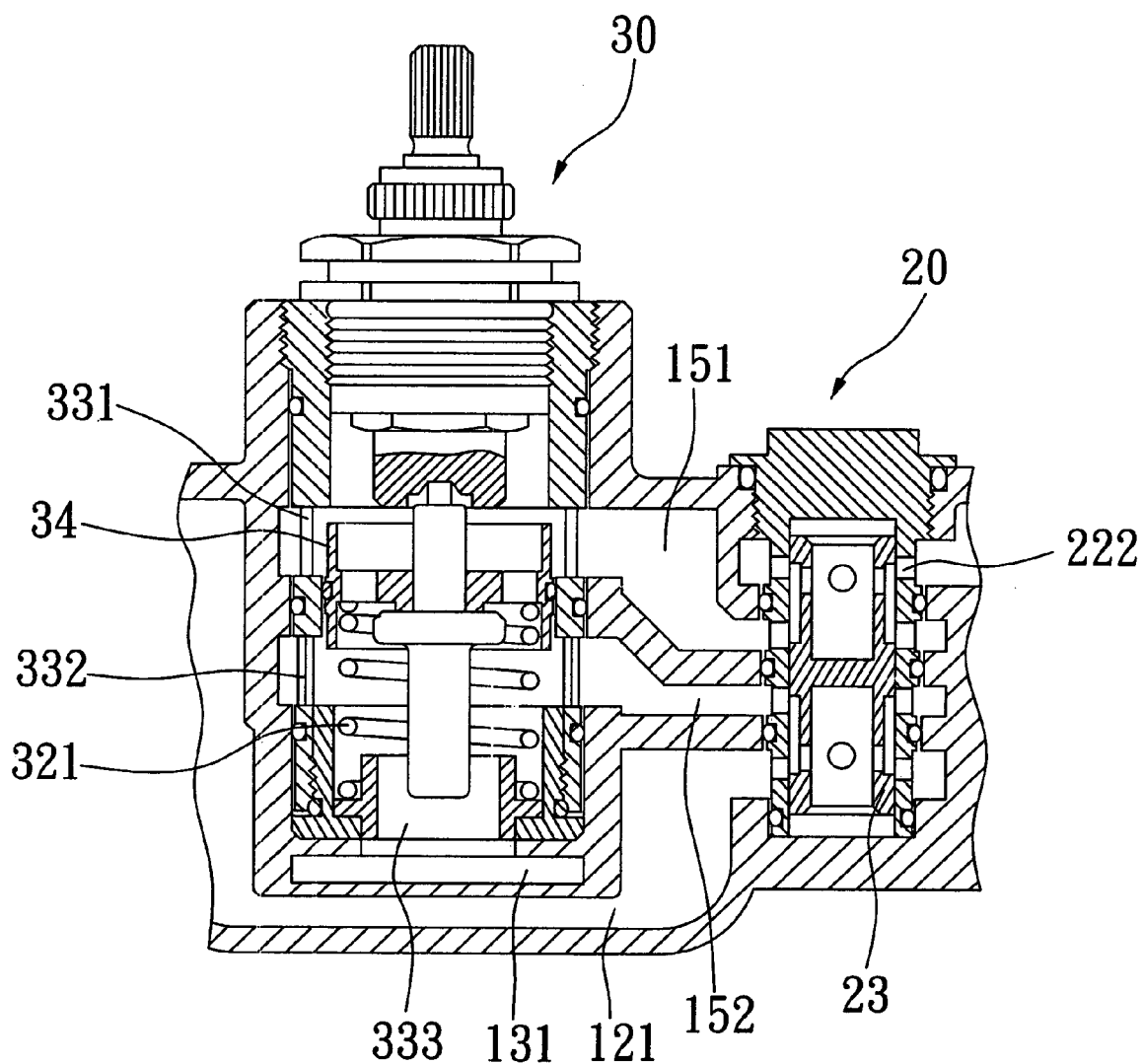
FIG. 4 shows the operation of the temperature sensing rod in lower temperature.
Figure 5:
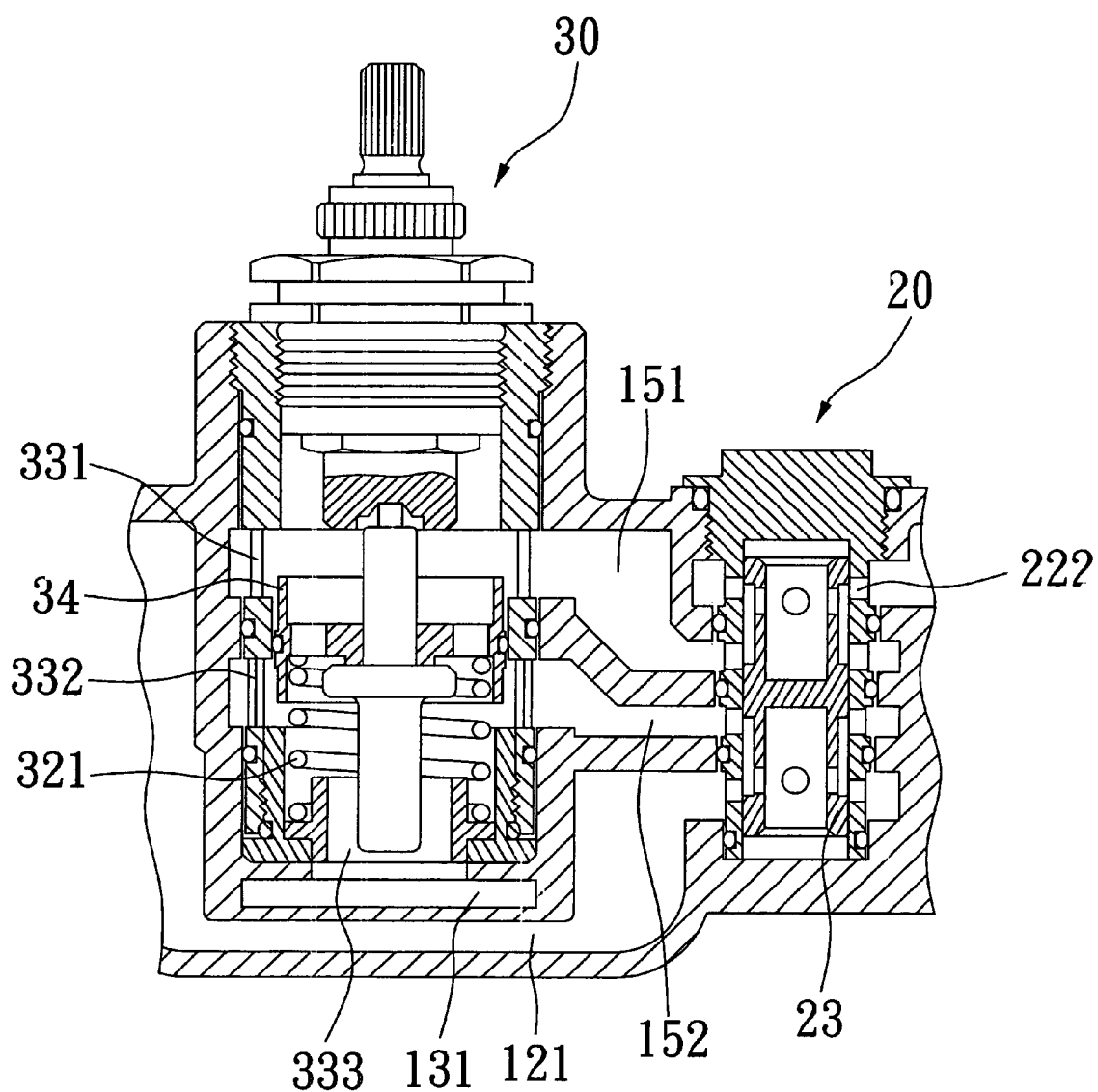
FIG. 5 shows the operation of the temperature sensing rod in higher temperature.
Figure 6:
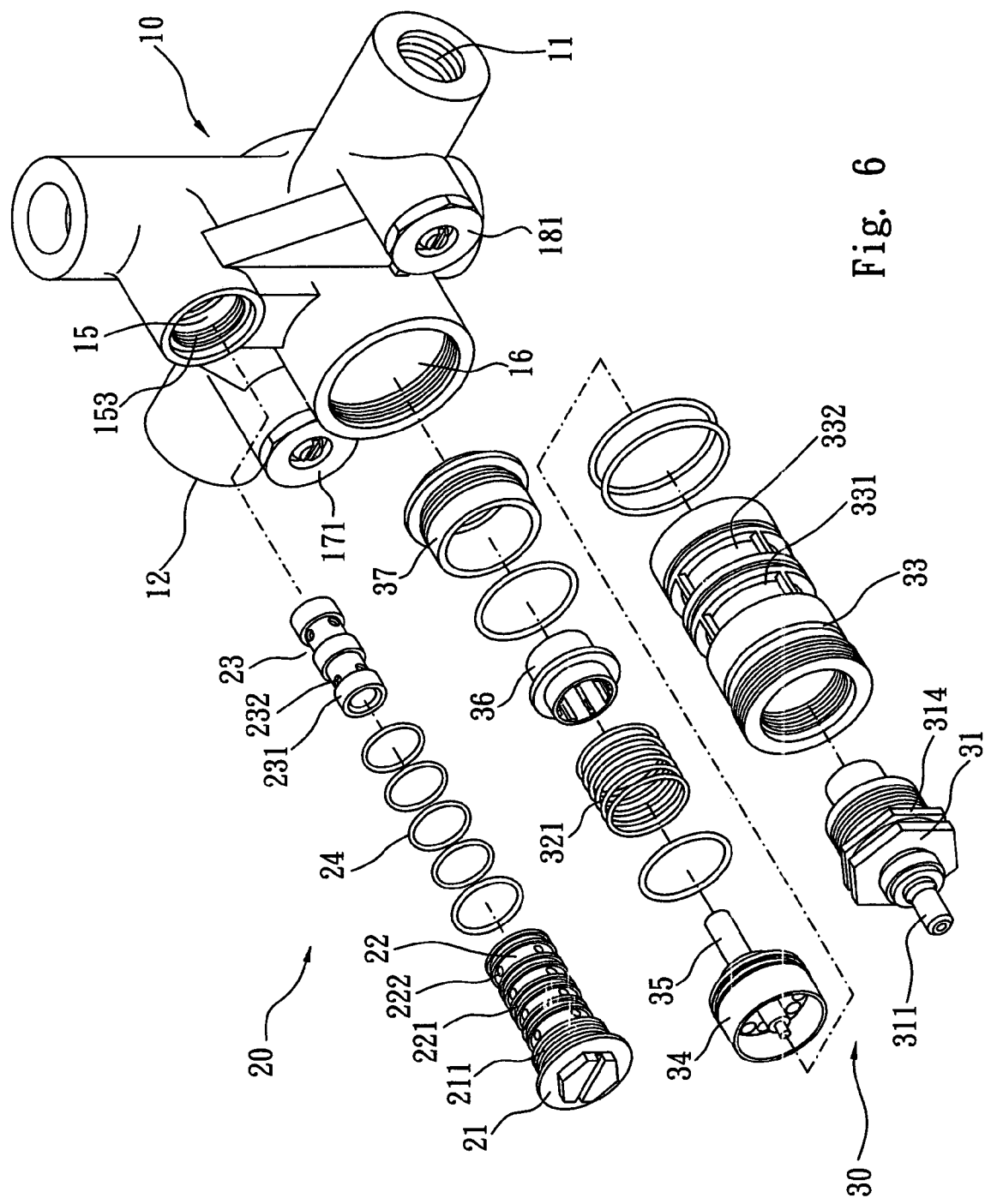
FIG. 6 is an exploded perspective view of the present invention.

The operation of the present invention will be described herein with reference to FIG. 2. When the faucet is opened, the hot water and cool water will flow into the second cool water inlet 11 and hot water inlet 12 through the valve body 10. The cool water flows through the check valve 171 of the third chamber 17 and then to the first chamber 15 through the cool water channel 111. Then the water flows through the via hole 222 of the sleeve 22 of the pressure balance device 20 to enter into the sliding rod 23. The hot water flows through the hot water inlet 12 and then through the check valve 181 of the fourth chamber and the hot water channel 121 to the first chamber 15. Similarly, the hot water flows through the via hole 222 of the sleeve 22 of the pressure balance device 20 to enter into the sliding rod 23. The cool water and hot water entering into the sleeve 22 of the pressure balance device 20 will push the sliding rod 23 so that the sliding rod 23 is adjusted according to the water pressure. At this time, the cool water and hot water enters into a balance condition. Then the water flows through the cool water channel 151 and the hot water channel 152 between the first chamber 15 and second chamber 16 to enter into the temperature control device 30 and then enters into the cool water inlet 331 and hot water inlet 332 of the temperature control valve body 33 to be mixed within the temperature control valve body 33 and to contact with the temperature sensing rod 35. Water temperature is sensed precisely by the temperature sensing rod 35 so that the temperature sensing rod 35 expands or contracts slightly to drive the movable block 34 to move so as to control the opening of the cool water inlet 331 or the hot water inlet 332. Thereby when the water is too hot, see FIG. 5, the temperature sensing rod 35 will expand to drive the movable block 34 to move downwards to seal the hot water inlet 332. Or the hot water inlet is reduced to make the movable block 34 to move downwards so that the inlet of cool water expands to reduce water temperature so as not to hurt the users. Likewise, if water temperature is too low, see FIG. 4, the temperature sensing rod 35 will contract, and by the resilient force of the spring 321, the movable block 34 displaces to seal or reduce the cool water inlet 331 so as to achieve the object of adjust the water temperature precisely and accurately.

Figure 7:
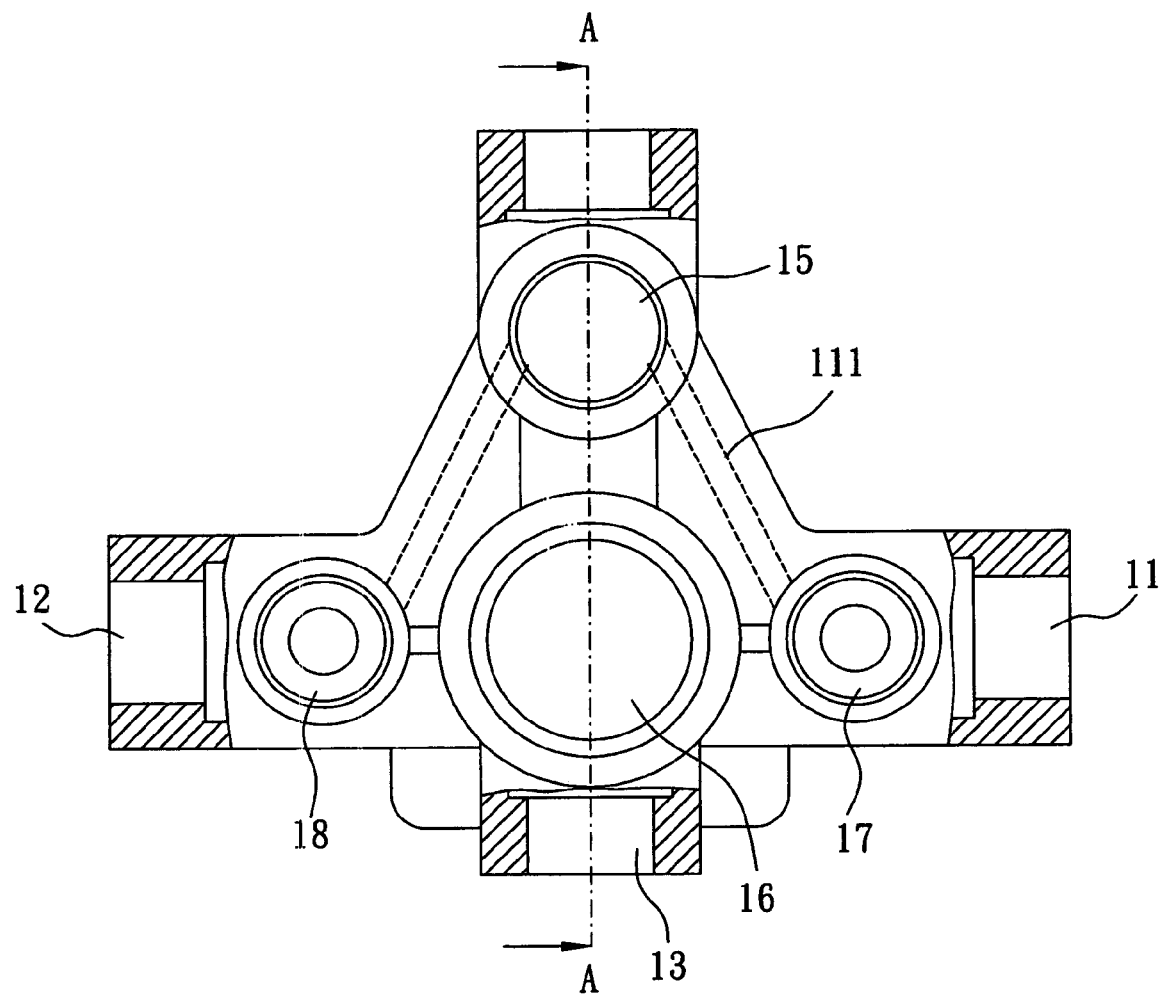
FIG. 7 is a schematic view about another configuration of the valve body of the present invention.
Figure 8:
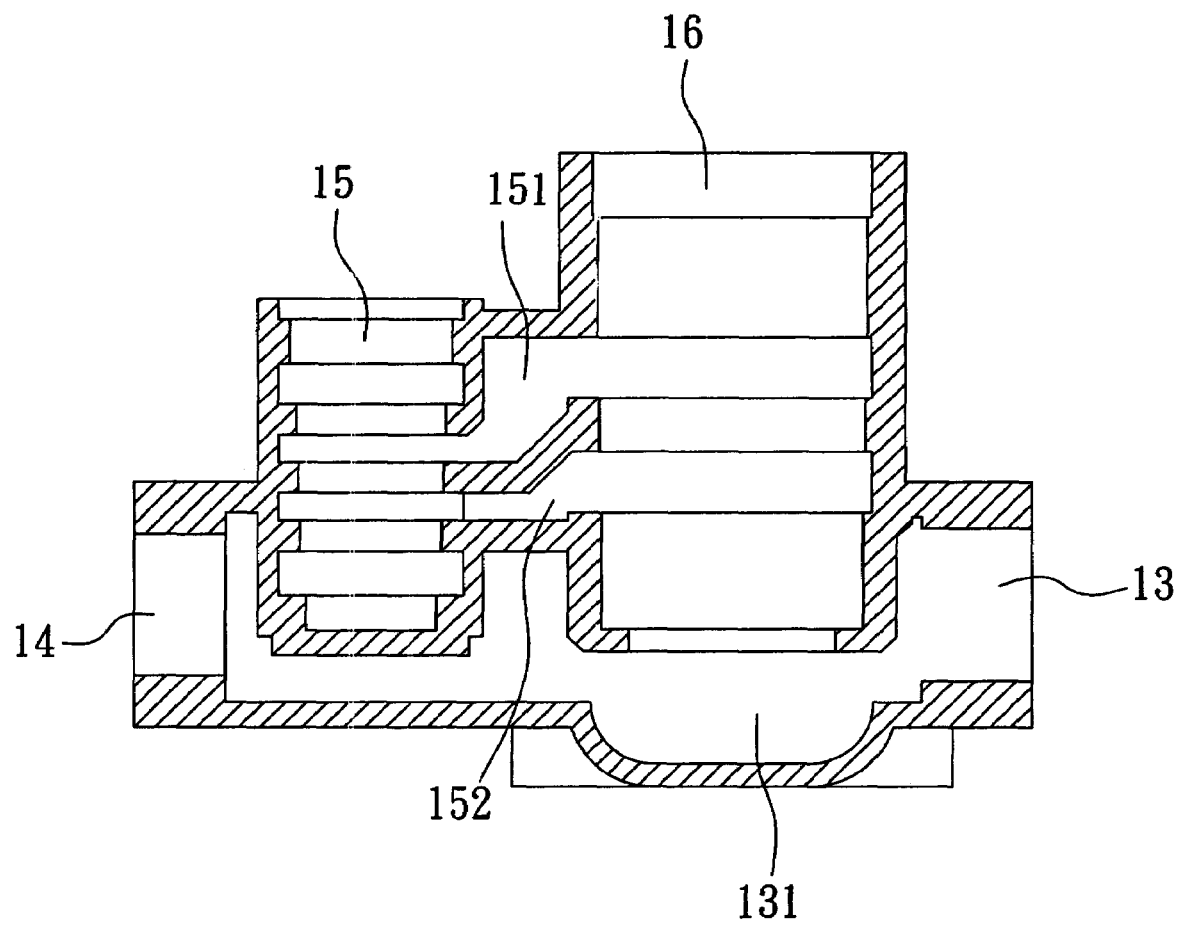
FIG. 8 is a cross sectional view along the line A-A of FIG. 6.

However in FIGS. 7 and 8, another configuration of the valve body is illustrated, wherein the first chamber 15 and second chamber 16 are communicated in parallel.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A dual-function valve with pressure adjustment and temperature control functions comprising:

a valve body having a first cool water inlet, a first hot water inlet, two first mixing water outlets, a first chamber and a second chamber; the first chamber and second chamber being communicated by a second cool water channel and a second hot water channel; the second chamber being communicated to the first mixing water outlets through a water outlet channel;

a pressure balance device for adjusting the water pressures of hot water and cool water; the pressure balance device being installed in the first chamber; and a temperature control device installed in the second chamber; the temperature control device adjusting the amount of water flowing into the second chamber by expansion and contraction of the mixing water of hot water and cold water; the temperature control device being connected to the first chamber; and wherein the pressure balance device is formed by an upper cover, a sleeve, and a sliding rod; the upper cover is formed with outer thread which is screwable with the inner thread of the first chamber so that the pressure balance device is firmly secured to the first chamber; the sleeve is a hollow tube; a top thereof is combined to the upper cover; an exterior of the sleeve is installed with four annular trenches for installing a water stop washer; the walls between the annular trenches are installed with a plurality of through holes so that water can flow through the through holes; the sliding rod is installed in the sleeve; by water pressure, the sliding rod is slidable within the sleeve to adjust the pressures of the hot water and cool water to be in a balance condition; a middle and two ends of the sliding rod are installed with water stop flanges for controlling the water flow in the sleeve.

2. The dual-function valve with pressure adjustment and temperature control functions as claimed in claim 1, wherein the first cool water inlet is installed with a third chamber and the first hot water inlet is formed with a fourth chamber; the third chamber is installed with a check valve and the fourth chamber is installed with a check valve so as to guide the water flow in the predetermined direction and thus be useful in emergency maintenance; the third chamber is communicated to the first chamber through a first cool water channel so that the water flows through the third chamber to the first chamber; the fourth chamber is communicated to the first chamber through a first hot water channel so that water flows through the fourth chamber to the first chamber.

* * * * *